Figure 1:
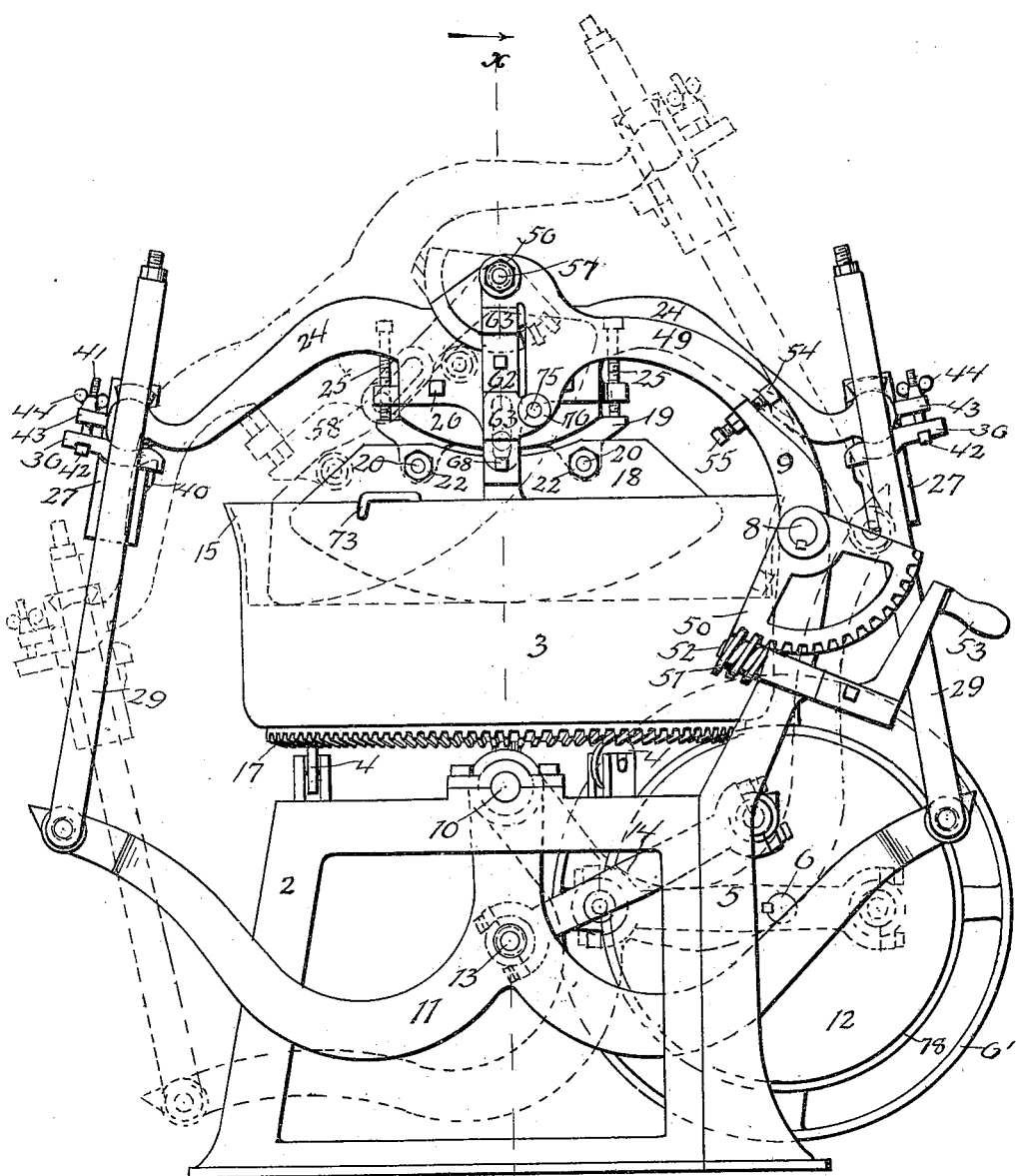

(No Model.) 7 Sheets—Sheet 1.
J. JESSEN.
MEAT CUTTING MACHINE.

No. 547,147. Patented Oct. 1, 1895.

Witnesses. Inventor.
James Jessen
By Paul Hawley
his attorneys

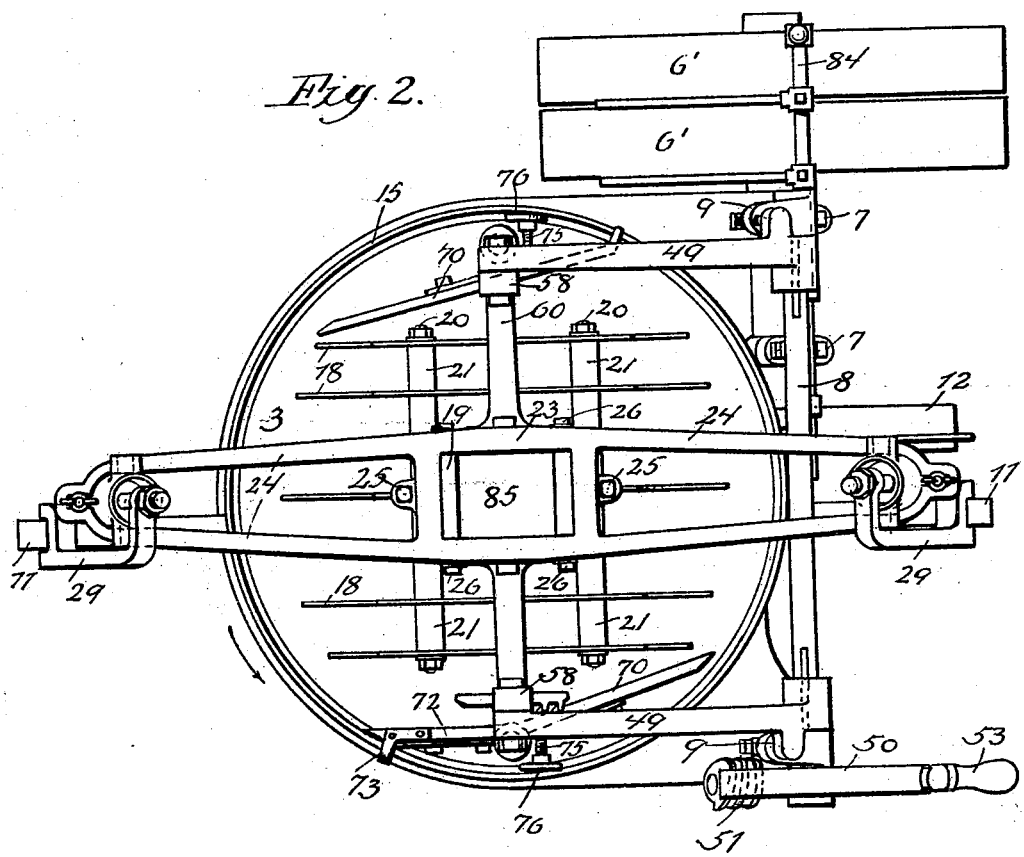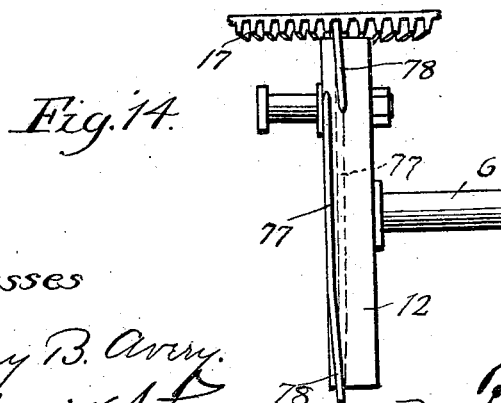

(No Model.)　　　　　　　　　　　　　　　　　　7 Sheets—Sheet 3.
J. JESSEN.
MEAT CUTTING MACHINE.

No. 547,147.　　　　　　　　　　　Patented Oct. 1, 1895.

Witnesses.　　　　　　　　　　　　Inventor:
Henry B. Avry.　　　　　　　　　　James Jessen.
Frederick D. Lyon.　　　　　　　By Paul of Hawley
　　　　　　　　　　　　　　　　　　his attorneys.

ANDREW B. GRAHAM. PHOTO-LITHO. WASHINGTON. D.C.

(No Model.) 7 Sheets—Sheet 4.

J. JESSEN.
MEAT CUTTING MACHINE.

No. 547,147. Patented Oct. 1, 1895.

Witnesses. Inventor.
Henry B. Avery. James Jessen.
Fredrick S. Lyon. By Paul Hawley
Att'ys.

(No Model.) 7 Sheets—Sheet 5.
J. JESSEN.
MEAT CUTTING MACHINE.
No. 547,147. Patented Oct. 1, 1895.
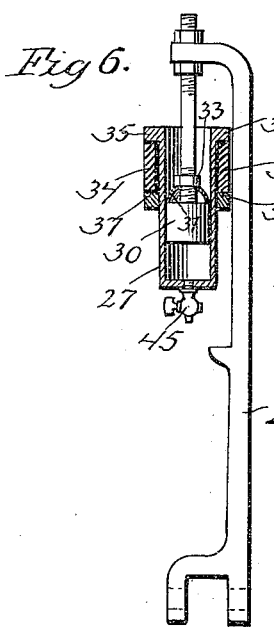
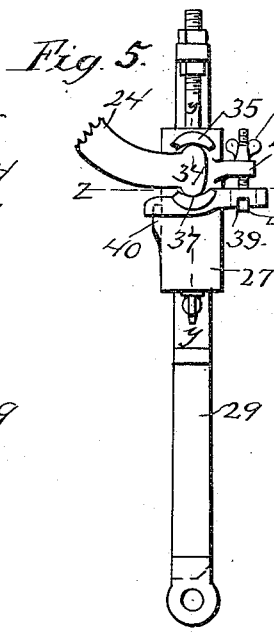
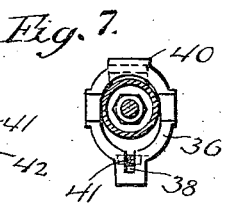
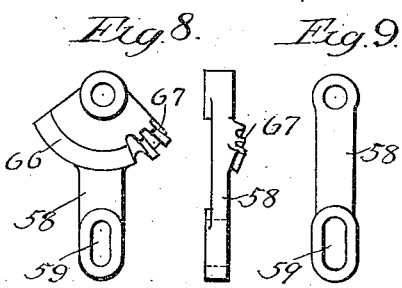
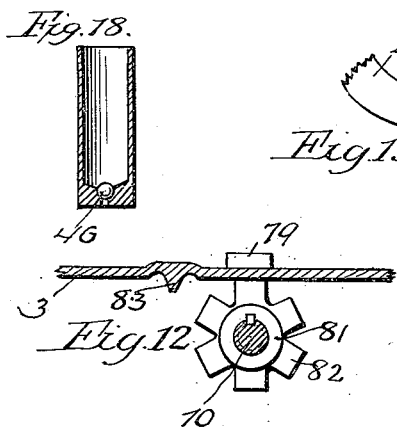
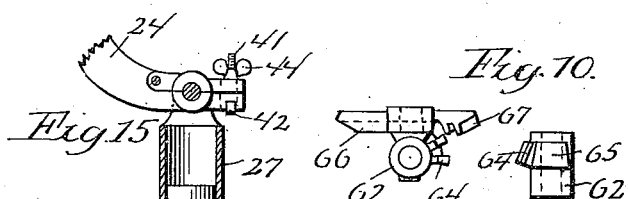
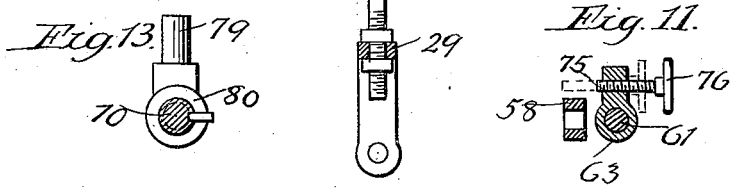
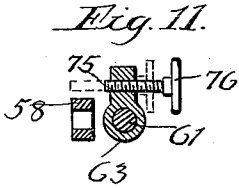
Witnesses.
Henry B. Avery
Frederick S. Lyon
Inventor
James Jessen
By Paul O. Hawley
his attorneys.

(No Model.) 7 Sheets—Sheet 6.

J. JESSEN.
MEAT CUTTING MACHINE.

No. 547,147. Patented Oct. 1, 1895.

Witnesses.
Henry B. Avery.
Frederick L. Ryon.

Inventor.
James Jessen
By Paul O'Rawley
his attys.

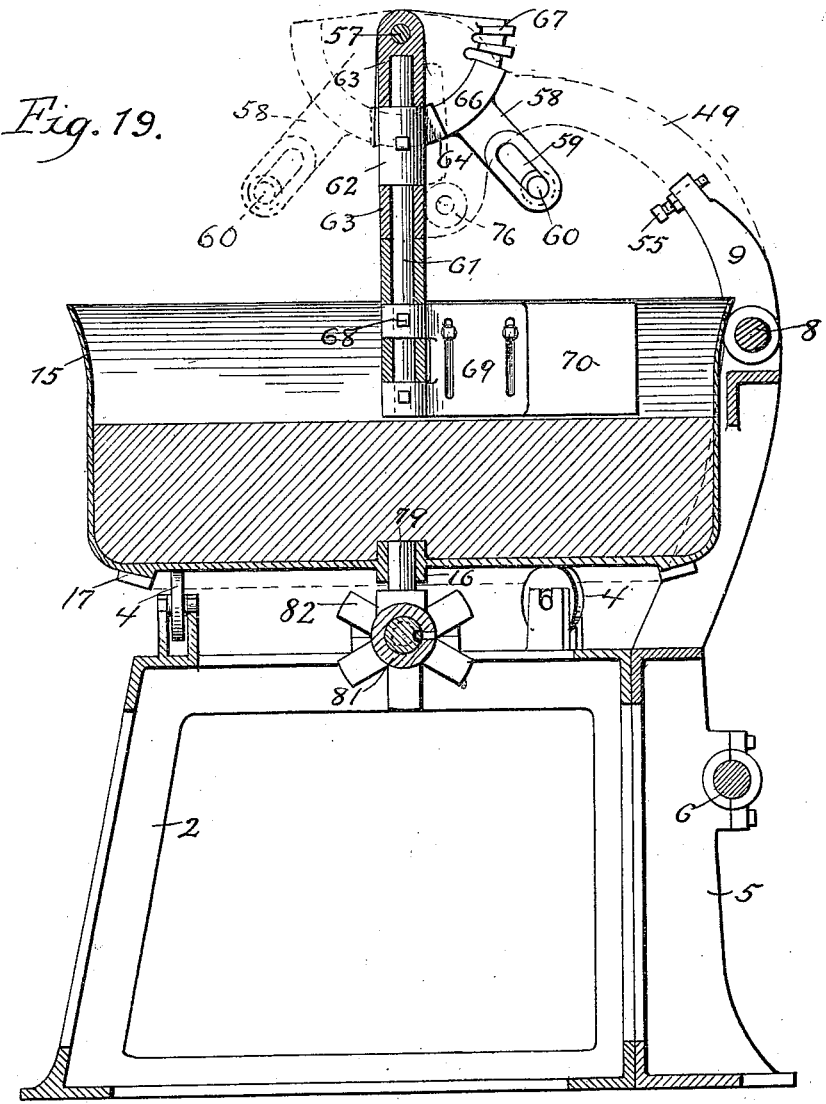
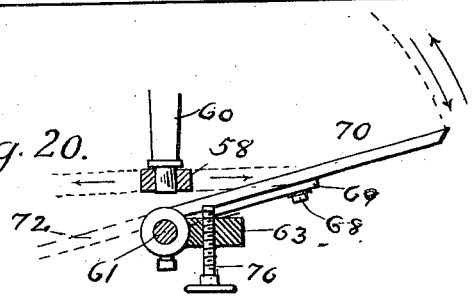

UNITED STATES PATENT OFFICE.

JAMES JESSEN, OF MINNEAPOLIS, MINNESOTA.

MEAT-CUTTING MACHINE.

SPECIFICATION forming part of Letters Patent No. 547,147, dated October 1, 1895.

Application filed July 3, 1894. Serial No. 516,479. (No model.)

*To all whom it may concern:*

Be it known that I, JAMES JESSEN, of the city of Minneapolis, county of Hennepin, State of Minnesota, have invented certain new and useful Improvements in Meat-Cutting Machines, of which the following is a specification.

My present invention is an improvement on my application filed May 13, 1893, Serial No. 474,161, and allowed November 27, but since forfeited. I desire in this application to re-embody the principal constructions and claims of the former application.

My invention relates to that class of motive-power machines in which a series of curved cutter-blades or knives are rocked upon a suitable meat-holding block, and which are generally known as "rockers." These machines are considered by sausage-manufacturers and meat-dealers generally to be the best for cutting and reducing all kinds of meat to a fine state, as they do not pound or grind it, but leave the finished product clear cut and uninjured. The main objection to the machines of this class, as heretofore constructed, has been their great size and cost in proportion to capacity. The difficulty has been in imparting the necessary speed to the rocking cutter-blades without jerking the machine, especially when reversing the motion of the blades. The object I have in view is to provide a machine having a smooth and steady motion throughout, and a comparatively high rate of speed, and which shall occupy but little floor-space and be comparatively cheap and simple of construction. A further object is to arrange the cutters to work freely upon the block, depending on weight to force them through the meat, whereby they are free to rise from the block should a bone or a foreign substance or an excess of meat come underneath, thus avoiding injury to the machine; further, to provide means for mixing the meat on the block and feeding it under the cutters automatically; further, to guard against the wearing of grooves in the block and to rotate the same intermittently, and, finally, to provide means for easily and quickly raising and removing the cutters from the block when necessary for cleaning or sharpening.

To these ends my invention consists, generally, in the constructions and combinations, all as hereinafter described, and particularly pointed out in the claims, taken in connection with the accompanying drawings, in which—

Figure 3:
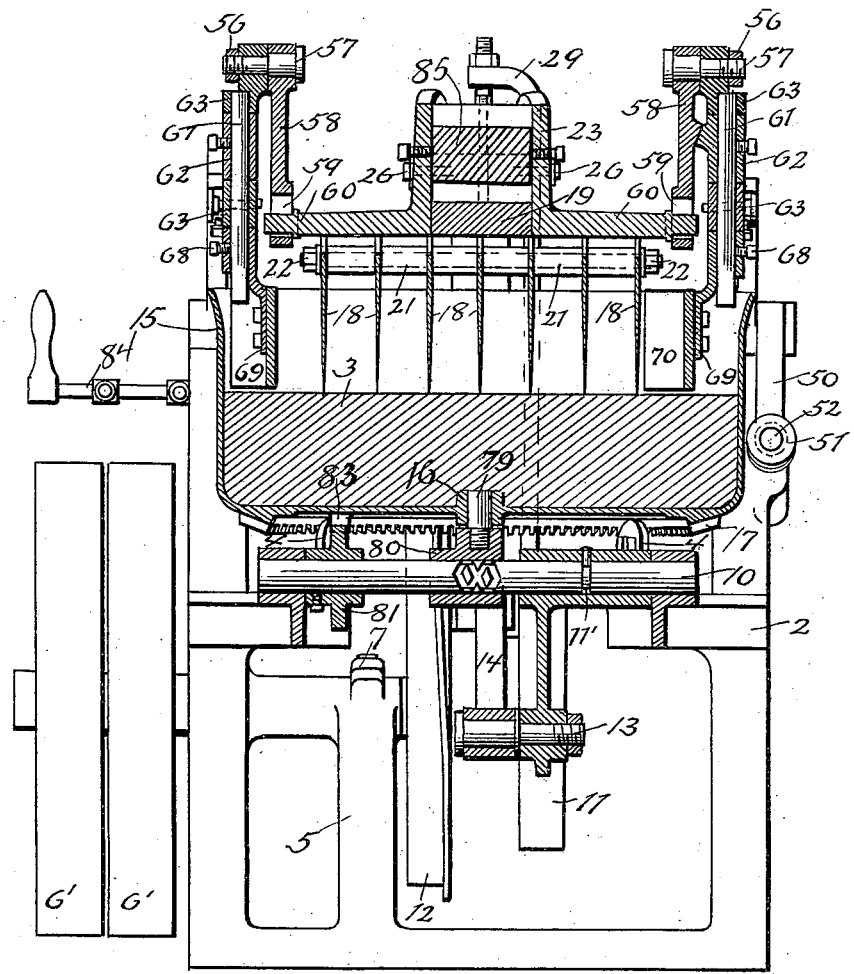
Figure 4:
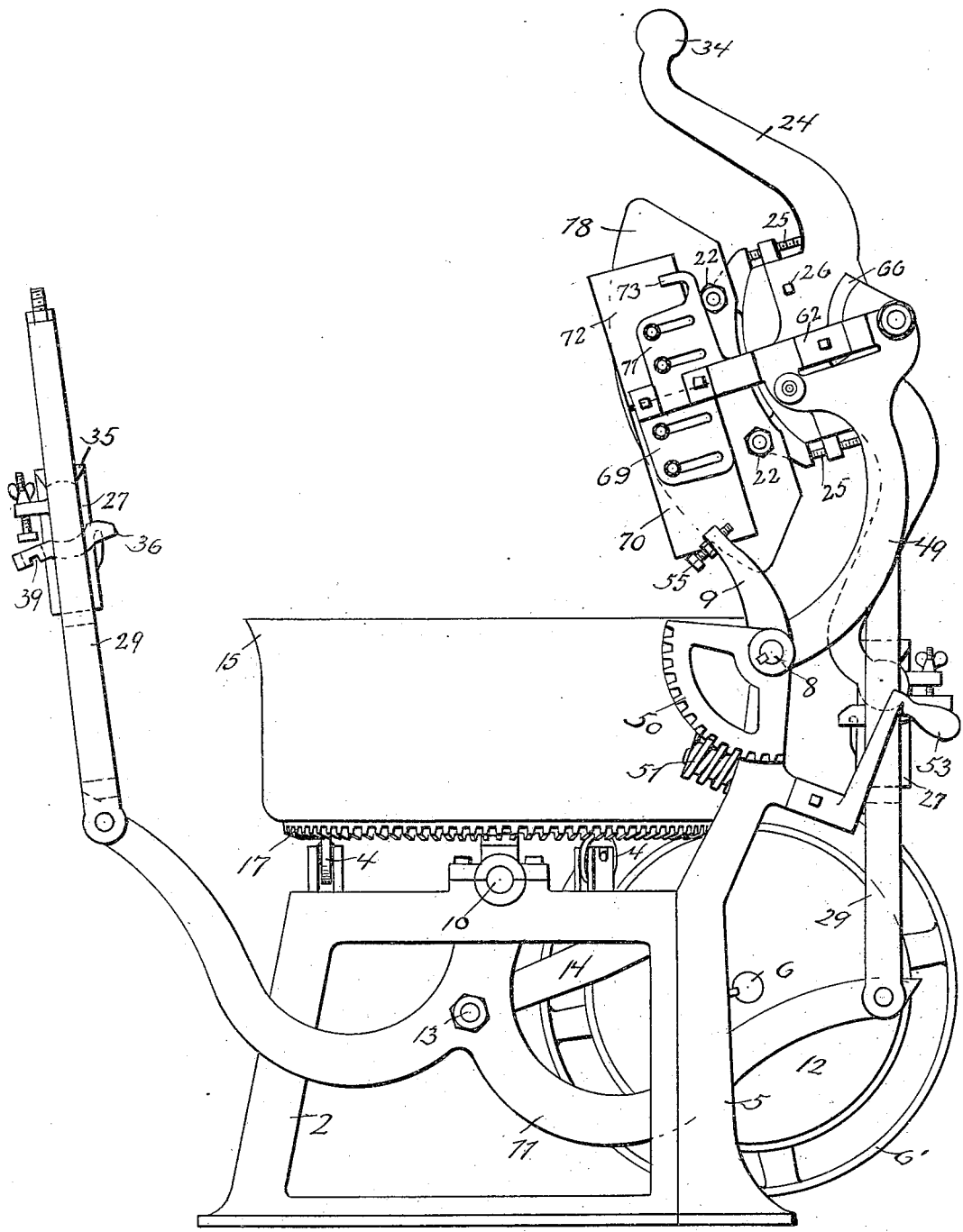
Figure 16:
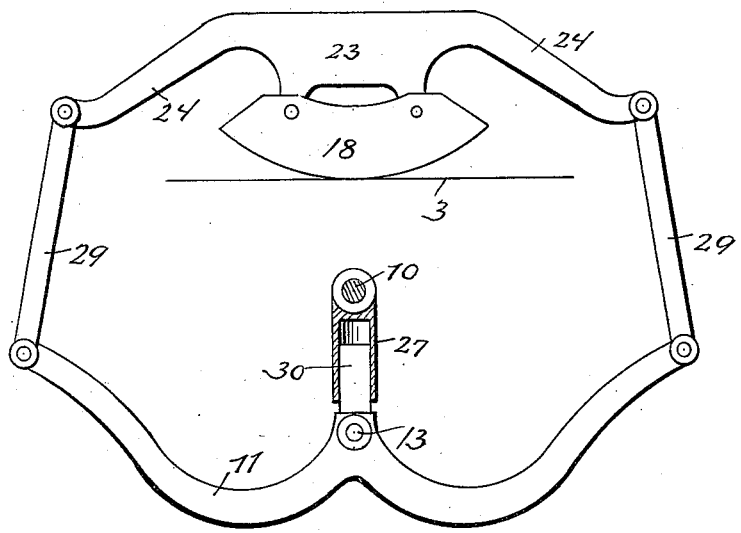
Figure 17:
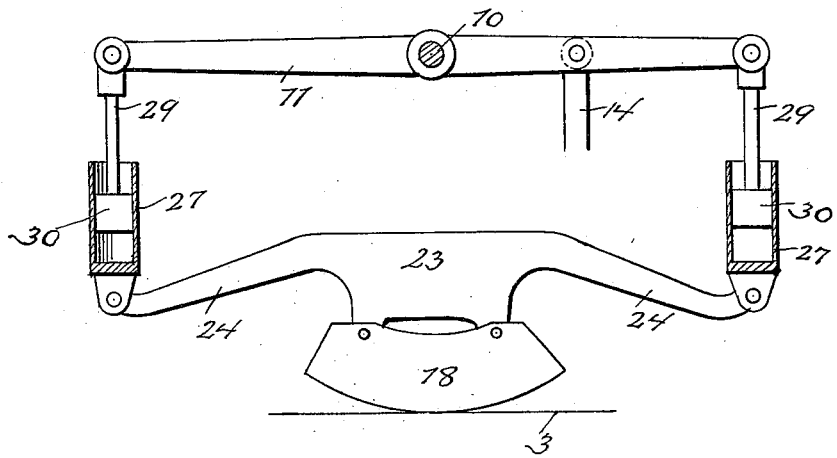

Figure 1 is a side elevation of a machine constructed in accordance with my invention. Fig. 2 is a plan view thereof. Fig. 3 is a vertical section on the line $x\,x$ of Fig. 1. Fig. 4 is a side elevation similar to Fig. 1, but showing the cutters raised away from the block. Fig. 5 is a detail view of one of the slip-joint and cushion connections between the cutter-blades and the motive parts of the machine. Fig. 6 is a vertical section on line $y\,y$ of Fig. 5. Fig. 7 is a horizontal cross-section on the line $z\,z$ of Fig. 5. Fig. 8 is a front and side elevation of one of the guide-links for the cutter-frame, which also operates the feeder. Fig. 9 is a detail of a link without provision for operating the feeder. Fig. 10 shows detail views of additional parts of the feeding mechanism. Fig. 11 is a detail view illustrating the manner of supporting the guide-links when the cutter-blades are to be raised away from the cutter-block. Figs. 12 and 13 are details of the means employed for laterally moving the block. Fig. 14 is a detail of the block-rotating mechanism. Fig. 15 shows a modified form of a connection similar to Fig. 6. Figs. 16 and 17 are modifications of the compensating medium between the cutter-blades and motive parts of the machine. Fig. 18 is a modified construction of one of the parts shown in Fig. 6. Fig. 19 is a detail view illustrating the mixing and feeding mechanism. Fig. 20 is a further detail thereof.

In the drawings, 2 represents the main frame of the machine, upon which the cutter-block 3 is supported by suitable rollers 4, preferably three in number. Rigidly connected to the frame 2 is the rear frame 5, upon which the main driving-shaft 6, with the fast and loose pulleys 6', is journaled in suitable boxes 7. The frame 5 extends upward to near the top of the block 3, where it forms bearings for the transverse rock-shaft 8. Extensions 9 9 project from the top of the frame 5 for a purpose hereinafter described.

Journaled in bearings on the frame 2 and central to the block 3 is a transverse shaft 10, on which is mounted free to rock thereon the compound rocker-arm 11. A groove 11' is provided in the shaft and a pin projects into the same. On the main driving-shaft 6 is secured a crank-wheel 12, which is connected to the rocker-arm at 13 by the connecting-rod 14. The block 3 is inclosed by the rim 15, which is preferably made in the shape of a tub, having the central hub 16 and provided on its bottom with a circular rack 17. A series of curved blades 18 are secured to a frame 19, preferably by means of rods 20, passing through openings in the frame and in the blades. Square collars 21 are interposed between the blades and securely clamped together by nuts 22. A supplementary frame 23, having the extensions 24, is adjustably secured to the frame 19 by means of the adjusting-screws 25 and the clamping-screws 26. The extended arms 24 are pivotally connected to the small dash-pots 27. Connecting-links 29, carrying the piston-heads 30, (see Fig. 5,) are pivoted to each end of the rocker-arm 11. The piston-heads 30 are adapted to reciprocate in the dash-pots 27 and connect practically air-tight therewith. A leather cup 31 is preferably provided on the piston-rod 32 and secured by a nut 33. The extensions 24 terminate in the rounded heads 34. Lugs 35, having a concave under surface, project from the dash-pots 27 and fit the heads 34. An oblong collar 36, provided with a concave 37, a slot 38, and a notch 39, is pivotally supported on a lug 40. A screw-threaded bolt 41, having the oblong head 42, passes through a lug 43 on the dash-pot and is on top thereof provided with a thumb-nut 44. The bolt-head normally fits in the notch 39 to prevent it from turning, and thereby also holding the collar 36 against the head 34. The concaves of the collar 36 and the lugs 35 thus form a bearing for the head 34, which is free to turn slightly therein. To disconnect the arms, it is only necessary to unscrew the thumb-nut, when the bolt-head is disengaged from the notch, and by turning the bolt the collar drops, the bolt-head passing through the slot 38. A stop-cock 45 is provided in the dash-pot for the purpose of removing oil from the same and also for regulating the air-supply. An automatic air-controlling valve 46 may be substituted, as shown in Fig. 18. In Fig. 15 a modified form of dash-pot is shown. It is here coupled direct to the arm 34 and the piston-rod enters through the opposite end, which is provided with a stuffing-box 47. Keyed to the rock-shaft 8, heretofore mentioned, are the strong lifting-arms 49 and the adjusting toothed segment 50. A worm 51 engages the segment 50 and is secured on a short shaft 52, which is journaled on the frame 5. The shaft 52 also carries an operating-handle 53. Lugs 54 project from the lifting-arms 49 and normally bear against screws 55, passing through the extensions 9 9 of the frame. The upper ends of the lifting-arms 49 terminate in a fork or jaw, in the upper part of which are securely fastened by nuts 56 the stud-pins 57. Links 58, having slots 59, are pivoted on the stud-pins 57. Projecting into the slots 59 are the studs 60, which are integrally connected to the supplementary frame 23. Short shafts 61, having collars 62, are journaled in bearings 63. I have shown one of the collars 62 provided with a bevel-gear segment 64 and a beveled segment 65. Similar segments 67 and 66, respectively, are provided on the guide-link 58. The bevel-gears 64 and 67 and the beveled segments 65 and 66 are adapted to engage each other successively.

Fastened to the lower end of the short shaft 61 by a set-screw 68 is the slotted plate 69, to which is secured the feed plate or paddle 70. Loosely pivoted on the shaft is another slotted plate 71, which supports the oppositely-arranged feed-plate 72. The plate 71 has a hook 73, which normally rests on the upper edge of the rim of the block. One or both of the shafts 61 may be securely fastened to the arms 49, in which case the bevel-gear segments on the collar, and also that on the link, are dispensed with, as shown in Fig. 9. Screw-threaded studs 75, provided with operating-heads 76, are arranged on the lower member of the fork of the lifting-levers, as shown in Figs. 11 and 19, and are adapted to pass through the same, projecting into the path of the links 58 for the purpose of supporting the links when the cutters are raised from the block. On the periphery of the crank-wheel 12 is the intermittent worm 15, adapted to engage the circular rack 17 of the tub or block 15. The worm is composed of the parallel and diverging sections 77 and 78, respectively, which join each other and make a continuous flange once around the wheel, as shown in Fig. 14. The cutter-block 3 is centered on the pin 79, which is secured in a collar 80. The collar 80 is loosely mounted on the transverse shaft 10. A pin projects from the inside thereof and engages a right-and-left screw-thread on the shaft 10. (See Figs. 3 and 13.) A wheel 81, having a series of square-faced teeth 82, is fastened to the shaft 10, and a lug or lugs 83, on the under side of the tub or block, are adapted to engage said teeth and rotate the shaft. When the lug 83 is disengaged from the teeth, the shaft is held stationary by the square-faced teeth 82, bearing against a track on the under side of the block. A belt-shifter 84 is provided to facilitate the starting and stopping of the machine. To balance the motion of the machine, I preferably make the crank-wheel in the shape of a heavy fly-wheel, and I also arrange a vertically-adjustable weight 85 in the cutter-blade frame above the center of gravity to balance the motion of the cutter-frame and add force to the cutters.

The operation of the machine is as follows: Power being applied to the main driving-shaft, an oscillating motion is imparted to the compound rocker-arm 11 by means of the crank-wheel 12 and connecting-rod 14. The motion is thence transmitted to the cutter-blades by means of the connecting-links 29;

but as the rocker-arm and cutter-frame naturally travel at varying speed, or, as the connecting-point of the rocker-arm describes a semicircle and the connecting-point of the cutter-frame a cycloid, an adjusting or yielding medium is necessary. The piston-head 30 being connected to the rocker-arm and the dash-pot 27 being connected to the cutter-frame, said piston-head being free to reciprocate affords the necessary adjustment. Tracing the motions of the several parts in a single stroke and commencing at the position shown in full lines in Fig. 1, it will be seen that the piston-heads in that position will be in about the middle of the dash-pots, as shown in Fig. 6. Motion being imparted to the rocker-arm, the downward-moving piston-head will be cushioned against the air in the dash-pot below it, and, carrying the dash-pot along, it will impart a rolling motion to the cutter-blades. The opposite piston-head will at first move slightly up in its dash-pot, but will soon be overtaken by the same, and when it comes to a stop the motion of the dash-pot is arrested by the compressed air forming a cushion between its bottom and the piston-head. In the reverse motion the force is exerted downward by the upper piston-head and against the air-cushion. The air expands while the cutters pass the center, and the same operation is repeated with the motion reversed. It will be seen that the force exerted on the cutters is always downward, thus holding them down to the work on the meat with no tendency of lifting them or jerking them away from the block. It is also obvious that the stopping and reversing of the motion are always softened by the air-cushions. In this manner a smooth and steady rocking motion is obtained and a higher rate of speed is possible without jar. The cutter-blades are kept in their path and prevented from sliding on the meat by the links 58, which are pivoted at a point so that their slots 59 will describe practically the same curve as the studs of the cutter-frame held in the same. The slots 59 and the adjusting or slide connection between the rocker-arm and the cutter-frame together will permit the cutters to rise from the block for any reason whatever. As the links swing in one direction, the teeth of the same, where such are provided, will mesh with the teeth of the collar 62, and thereby turn the feeder-plate and the meat resting against it under the cutters as they are raised. When reversing the motion, the plate will be immediately returned out of the path of the cutters and will be stationary till the same ends of the cutters are again raised. By this means the meat is thoroughly mixed as the cutters work the meat out from the center of the block and the feeder returns it. The front end of the feeder is held close up to the rim and conducts the meat to the moving plate. The stationary feeder board or plate on the opposite side of the block conducts the meat as near as possible to the cutters. The block is rotated by the intermittent spiral on the crank-wheel engaging the circular rack of the block. The worm is preferably arranged so that the block is stationary when the cutters are raised and while reversing their motion. As the block rotates, its lug or lugs 83 engage the wheel 81 and rotate the shaft 10, thereby slightly changing the position of the block. Every time the wheel 81 is rotated the cutters will change their cutting path on the block, and the block will thus be kept smooth. When the meat is to be removed from the block, the cutter-frame is uncoupled from the dash-pot in the manner before described. The links 58 being placed in a perpendicular position, the hand-wheel 76 is operated, thus moving the screw-threaded studs 75 into the path of the links 58 in a position to engage said links. The worm-handle 53 is then operated, thus tilting or raising the arms, when the links 58, carrying the cutters, will gravitate and rest on the studs 75, thus sustaining the cutters in a vertical position, as shown in Fig. 4, in which position the parts are very easily cleaned. In returning the cutters to the block the lugs on the lifting-arms strike against the bolts, and by further forcing the handle the arms are secured firmly in place. By omitting to operate the studs 75 and keeping them out of engagement with the links 58 the cutter-blades and frame may also be raised from the block; but they will then be suspended from the upper pivot and in a horizontal position.

To compensate for the wearing of the block and readjust the cutter-blades to the working parts of the machine, the frame 19 is lowered with respect to the frame 23 by means of the adjusting-screws 25 and secured in place by the clamping-screws 26, by which means the frame 23 may remain in the same position.

In Fig. 16 I have shown the adjusting and cushioning medium interposed between the rocker-arm and the shaft 10. It may also be applied to the cutter-frame, and instead of an air-cushion a spring or rubber cushion may be substituted. It is also obvious that the rocker-arm may be arranged above the cutter-block, as shown in Fig. 17, and various changes and modifications made without departing from my invention.

Having thus described my invention, I claim as new and desire to secure by Letters Patent—

1. In a meat cutting machine, the combination with a frame carrying vertically rocking segmental cutter blades, said frame being extended beyond the end of the said cutter blades, of a rocker arm vertically connected to the extended portion of the said cutter blade frame and means for actuating said rocker arm substantially as described.

2. The combination with a frame, carrying vertically rocking segmental cutter blades, of an actuated rocker arm, connections between said rocker arm and said frame, and a yielding or compensating device, in connection with said rocker arm and said frame substantially as described and for the purpose set forth.

3. The combination with the vertically rocking segmental cutter blades, of an actuated rocker arm connected thereto, a yielding device connected to said rocker arm, and to said cutter blades and a cushion included in said device.

4. The combination with the frame carrying vertically rocking segmental cutter blades, of a cutter block, an actuated rocker arm pivoted beneath the block and connected with the said cutter blade frame, an actuating crank, a pitman connecting the same with said rocker arm and means for intermittently rotating the cutter block substantially as described.

5. The combination with the rotating block, of the vertically rocking segmental cutter blades, the actuated compound rocker arm, connections between the opposite ends of said rocker arm and the opposite ends of said cutter blades and an air cushion interposed in each connection.

6. The combination with a rotating block of a frame carrying vertically rocking segmental cutter blades, an actuated rocker arm connected to said frame and an air cushion or dash pot in connection with said rocker arm and said cutter blade frame and means for controlling the action of said dash pot, substantially as described.

7. The combination with the vertically rocking segmental cutter blades of pivoted guide links connected thereto, an actuated rocker arm, connections between the said arm and the said cutter blades and a yielding device in connection with said arm and said blades, substantially as described.

8. The combination with the cutter block of the vertically rocking segmental cutter blades, of an actuated rocker arm, connections between the said arm and said blades, pivoted lifting arms or levers, connections between said levers and said cutter blades, and means for rocking said arms or levers, whereby the cutter blades are raised away from the cutter block.

9. The combination with the vertically rocking segmental cutter blades, the actuated rocker arm, yieldingly connected thereto, the rotating cutter block and means for reciprocating said cutter block, laterally and at an angle to the path of the rocking cutter blades, substantially as described and for the purpose set forth.

10. The combination, with the vertically rocking segmental cutter-blades, the actuated rocker-arm yieldingly connected therewith and the intermittently rotating block, of a feed-plate arranged upon a vertical axis above said block, and means for periodically and horizontally turning said plate upon its axis, whereby it is moved beneath the cutter-blades and removed again while said cutter-blades are in a rocked or vertical position upon the block, substantially as described.

11. The combination with the vertically rocking segmental cutter blades 18 of the frame 23, the extensions 24, the actuated rocker arm 11, the connecting links or rods 29, the piston heads 30, reciprocating in the dash pots 27, the actuating crank-wheel 12 and the pitman 14 connecting said crank with the said rocker arm 11.

12. The combination, with the vertically rocking segmental cutter-blades 18, the actuated rocker-arm 11 yieldingly connected thereto, the cutter-block 3 and the circular rack 17 arranged on said block, of the rotating wheel 12 provided with a peripheral worm, said worm having the intermittently propelling and pausing segments 77 and 78 adapted to engage the rack 17 and imparting an intermittent rotative movement to the cutter-block, substantially as described.

13. The combination of the vertically rocking segmental cutter blades 18, the extended frame 24, the heads or pivots 34, the dash pot 27, the collar 36, the concaves or bearings 35 and 37, the pivotal support 40, the lug 43, the bolt 41, the nut 44, the piston head 30, the link or rod 29, the rocker arm 11, the pitman 14 and the actuating crank 12.

14. The combination, with the vertically rocking segmental cutter-blades, of a rotating cutter-block and a horizontal rotatable shaft arranged beneath said block, a right and left handed screw thread or worm arranged upon said shaft, a suitable stud engaging said thread or worm and a collar or sleeve upon said shaft, said sleeve having a center pin or pivot for the rotating cutter-block, and means for periodically rotating said shaft, whereby the cutter block is given a lateral and slowly reciprocating movement, substantially as described.

15. The combination with the vertically rocking segmental cutter blades 18, of the actuated rocker arm connected thereto, the frame 23, the studs or projections 60, the links 59 engaged by said studs, arms or levers 49 connected to the links 59 and to the shaft 8, the adjusting toothed segment 50 on said shaft, the worm 52 engaging the segment 50, the shaft 52, the operating handle 53, the projection 54 and the adjusting screw 55, substantially as described.

16. The combination, with the vertically rocking segmental cutter-blades and a normally stationary frame arranged above and at either side of said cutter-blades, of vertical guide-links having upper pivotal connections with said stationary frame and lower pivotal connections with said cutter-blades, said connections being central to the motions of said rocking cutter-blades, substantially as described.

17. The combination, with the segmental cutter-blades and a suitable frame for the same, of a normally stationary frame arranged beside and above said cutter-blades, a vertical guide-link having upper connections to said stationary frame and pivotal connections to said cutter-blades, a beveled toothed segment arranged upon said guide-link, a vertical rotatable shaft arranged opposite said guide-link, a beveled toothed segment and plain beveled segment arranged upon said shaft, said segment adapted to cooperate with and engage the similar segments upon the guide link, a feed-plate connected to said vertical shaft, a cutter-block, and means for vertically rocking the segmental cutter-blades upon the same whereby the feed-plate is alternately held stationary and turned horizontally across the top of the cutter-block, substantially as described.

18. The combination with the vertically rocking segmental cutter blades 18, of the actuated rocker arm 11 connected thereto, the rotating and laterally moving block 3, and the hinged feed plates 72 and 71, adapted to conduct the meat under the cutter blades, substantially as described.

19. The combination with the vertically rocking segmental cutter blades 18, secured to the frame 19, a supplementary frame 23 adjustably connected to the frame 19, a balancing weight 85 adjustably connected to said frames, the actuated rocker arm 11 and connections between the said rocker arm and the frames 19 and 23, substantially as described and for the purpose set forth.

In testimony whereof I have hereunto set my hand this 30th day of June, A. D. 1894.

JAMES JESSEN.

In presence of—
C. G. HAWLEY,
FREDERICK S. LYON.